(12) United States Patent
Palod et al.

(10) Patent No.: US 10,698,894 B2
(45) Date of Patent: Jun. 30, 2020

(54) GENERATING REPORTS FOR ENTERPRISE PAGES BASED UPON INSTRUMENTATION DATA GENERATED BY CLIENT COMPUTING DEVICES

(71) Applicant: Microsoft Technology Licensing, LLC, Redmond, WA (US)

(72) Inventors: Swapnil Palod, Redmond, WA (US); Sriram Kakara, Redmond, WA (US); Mark Saroufim, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/594,271

(22) Filed: May 12, 2017

(65) Prior Publication Data
US 2018/0329954 A1   Nov. 15, 2018

(51) Int. Cl.
| | |
|---|---|
| *G06F 16/00* | (2019.01) |
| *G06F 16/2453* | (2019.01) |
| *H04L 29/08* | (2006.01) |
| *G06F 16/9535* | (2019.01) |

(52) U.S. Cl.
CPC .... *G06F 16/24544* (2019.01); *G06F 16/9535* (2019.01); *H04L 67/02* (2013.01); *H04L 67/22* (2013.01)

(58) Field of Classification Search
CPC ................................................ G06F 16/24544
USPC ........................................................ 707/714
See application file for complete search history.

(56) References Cited

U.S. PATENT DOCUMENTS

| | | | |
|---|---|---|---|
| 7,035,926 B1 | 4/2006 | Cohen et al. | |
| 7,676,574 B2 | 3/2010 | Glommen et al. | |
| 8,341,259 B2 | 12/2012 | Error | |
| 8,930,818 B2 | 1/2015 | Cordasco | |
| 2003/0051031 A1 | 3/2003 | Streble | |
| 2008/0263009 A1* | 10/2008 | Buettner | G06F 16/90335 |
| 2016/0103665 A1* | 4/2016 | Liu | G06F 11/3466 |
| | | | 717/158 |

(Continued)

OTHER PUBLICATIONS

Wills, et al., "Usage analysis for web applications with Application Insights", https://docs.microsoft.com/en-us/azure/application-insights/app-insights-web-track-usage, Published on: Dec. 6, 2016, 16 pages.

(Continued)

*Primary Examiner* — Chelcie L Daye
(74) *Attorney, Agent, or Firm* — Medley, Behrens & Lewis, LLC

(57) ABSTRACT

Described herein are technologies relating to including instrumentation code in enterprise pages and generating a report for an enterprise page based upon instrumentation data and organizational data. Instrumentation code in an enterprise page, when executed by a processor, causes the processor to generate instrumentation data, where the instrumentation data includes an identifier for the enterprise page and an identifier for a user who accessed the enterprise page. The instrumentation data is added to an instrumentation dataset. A report is generated for an enterprise page based upon the instrumentation data and organizational data, such that the report indicates how users across different sectors of the enterprise interact with the enterprise page.

20 Claims, 10 Drawing Sheets

(56) References Cited

U.S. PATENT DOCUMENTS

2017/0005904 A1* 1/2017 Sharma .............. H04L 41/5009

OTHER PUBLICATIONS

"Web Analytics", https://web.archive.org/web/20110417093736/http:/appexchange.salesforce.com/listingDetail?listingId=a0N300000016cuSEAQ, Published on: Apr. 17, 2011, 1 pages.
Cofsky, Amanda, "Power BI Service March Update Part 2", https://powerbi.microsoft.com/en-us/blog/power-bi-service-march-update-part-two/, Published on: Mar. 31, 2016, 24 pages.
Guillen, et al., "Power BI Governance and Deployment Approaches", In White Paper of Microsoft, Mar. 2016, pp. 1-52.
Wills, et al., "Application Insights API for custom events and metrics", https://docs.microsoft.com/en-us/azure/application-insights/app-insights-api-custom-events-metrics, Published on: Nov. 16, 2016, 27 pages.
"Commvault", https://web.archive.org/web/20151011213656/http:/documentation.commvault.com/commvault/v10/article?p=whats_new/c_commcell_features.htm, Published on: Oct. 11, 2015, 5 pages.
Willems, Linda, "Article Usage Reports enable authors to track downloads and views", https://www.elsevier.com/connect/article-usage-reports-enable-authors-to-track-downloads-and-views, Published on: Sep. 24, 2013, 14 pages.

\* cited by examiner

US 10,698,894 B2

GENERATING REPORTS FOR ENTERPRISE PAGES BASED UPON INSTRUMENTATION DATA GENERATED BY CLIENT COMPUTING DEVICES

BACKGROUND

Conventionally, an enterprise may use a computer-executable application to disseminate information to users in the enterprise. In an example, web-based applications currently exist to assist enterprises with electronic document management and storage. Using such an application, a user in the enterprise can create a network-accessible web page that is accessible only to certain users in the enterprise (e.g., the page is not accessible to the general public). The web page may include information that is relevant to job functions of at least some users in the enterprise, such that it is desirable that these users periodically access the web page. In another example, computer-executable analytics applications exist, wherein these applications are configured to generate network-accessible pages that include visualizations of data that is relevant to one or more sectors (organizations) of the enterprise.

As the pages referenced above include information that may be relevant to the job function of at least some users in the enterprise, monitoring accesses to these pages by users in the enterprise may be beneficial. Using conventional instrumenting technologies, however, a relatively limited amount of data pertaining to enterprise page accesses can be acquired. More specifically, conventional instrumenting technologies are limited to tracking a number of views of an enterprise page over time. While this data may be useful in connection with understanding how many users in the enterprise view the enterprise page, there is a lack of actionable information therein thus, an enterprise user tasked with maintaining the enterprise page lacks insight as to whether the enterprise page is reaching its intended audience.

SUMMARY

The following is a brief summary of subject matter that is described in greater detail herein. This summary is not intended to be limiting as to the scope of the claims.

Described herein are various technologies pertaining to generating reports for enterprise pages. A user in an enterprise (e.g., a corporation, a governmental agency, a charitable organization, etc.) may maintain a network-accessible enterprise page, which can be a web page, a page of an analytics application, etc. The user can choose to instrument the enterprise page, such that the enterprise page includes instrumentation code or points to instrumentation code. The instrumentation code, when executed by a client computing device (operated by a user in the enterprise), causes the client computing device to generate instrumentation data about the enterprise page and transmit the instrumentation data to a server computing device that is in network communication with the client computing device. The server computing device is tasked with maintaining an instrumentation dataset. In an example, the instrumentation code can be a widget in the enterprise page, wherein the widget, when executed by a client computing device, causes the client computing device to generate instrumentation data and transmit the instrumentation data to the server computing device. In another example, when a user chooses to instrument an enterprise page, the user can retrieve instrumentation code from a content distribution network (CDN) of the enterprise and can insert the instrumentation code into the page.

Instrumentation data generated by a client computing device that executes the instrumentation code can include, but is not limited to including: 1) an identity of the enterprise page that is being accessed; 2) an identity of a user of the enterprise who is operating the client computing device; and 3) a timestamp that indicates when the enterprise page is accessed. Accordingly, each time that a client computing device accesses the enterprise page, the client computing device generates instrumentation data and transmits the instrumentation data to the server computing device.

The server computing device aggregates instrumentation data received from client computing devices operated by users of the enterprise into the instrumentation dataset, such that the instrumentation dataset is updated upon receipt of instrumentation data from a client computing device that is in network communication with the server computing device. The server computing device also maintains or has access to an organizational dataset. The organizational dataset can include a user identifier (ID) for each user represented in the organizational dataset, a sector (organization) of the enterprise to which the user belongs, a subsector (e.g. a team) of the sector to which the user belongs, a geographic location of the user, contact information for the user, a position of the user in a hierarchy of the enterprise, direct reports of the user, supervisors of the user, and so forth.

The server computing device receives a request to generate a report for the enterprise page from a client computing device that is operated by a user in the enterprise, wherein the request comprises an identifier for the enterprise page. The server computing device generates the report for the enterprise page responsive to receipt of such request. With more specificity, the server computing device can search the instrumentation dataset based upon the identifier for the enterprise page in the request, thereby resulting in creation of search results, wherein the search results include instrumentation data generated by client computing devices operated by users of the enterprise who accessed the enterprise page. As noted above, the instrumentation data includes identifiers for the users. Using these identifiers, the server computing device can retrieve organizational information pertaining to the users from the organizational dataset. For instance, the server computing device can perform a join between the search result and the organizational dataset, thereby creating join results, wherein such join results include identifiers for the users who accessed the enterprise page, times that the enterprise page was accessed by such users, and organizational data corresponding to the users. The server computing device generates the report for the enterprise page based upon the join results, such that the report indicates how the enterprise page was accessed across sectors of the enterprise.

In a nonlimiting example, the report can indicate that in the last week, a large number of users in the enterprise who belong to a first sector of the enterprise accessed the enterprise page, while a relatively small number of users in the enterprise who belong to a second sector of the enterprise accessed the enterprise page. A viewer of the report may then ascertain that visibility of the enterprise page needs to be increased with respect to users in the second sector. Additionally, the server computing device can update the report responsive to receipt of indications that the user has interacted with the report at the client computing device. For instance, the viewer of the report may wish to be provided with information as to how users of subsections of the first section accessed the page, times that the page was accessed by certain users in subsections, and so forth. It can be ascertained, then, that the server computing device, through use of organizational data in the organizational dataset, can generate a report about an enterprise page that depicts much more information about accesses to the enterprise page when compared to conventional reports.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
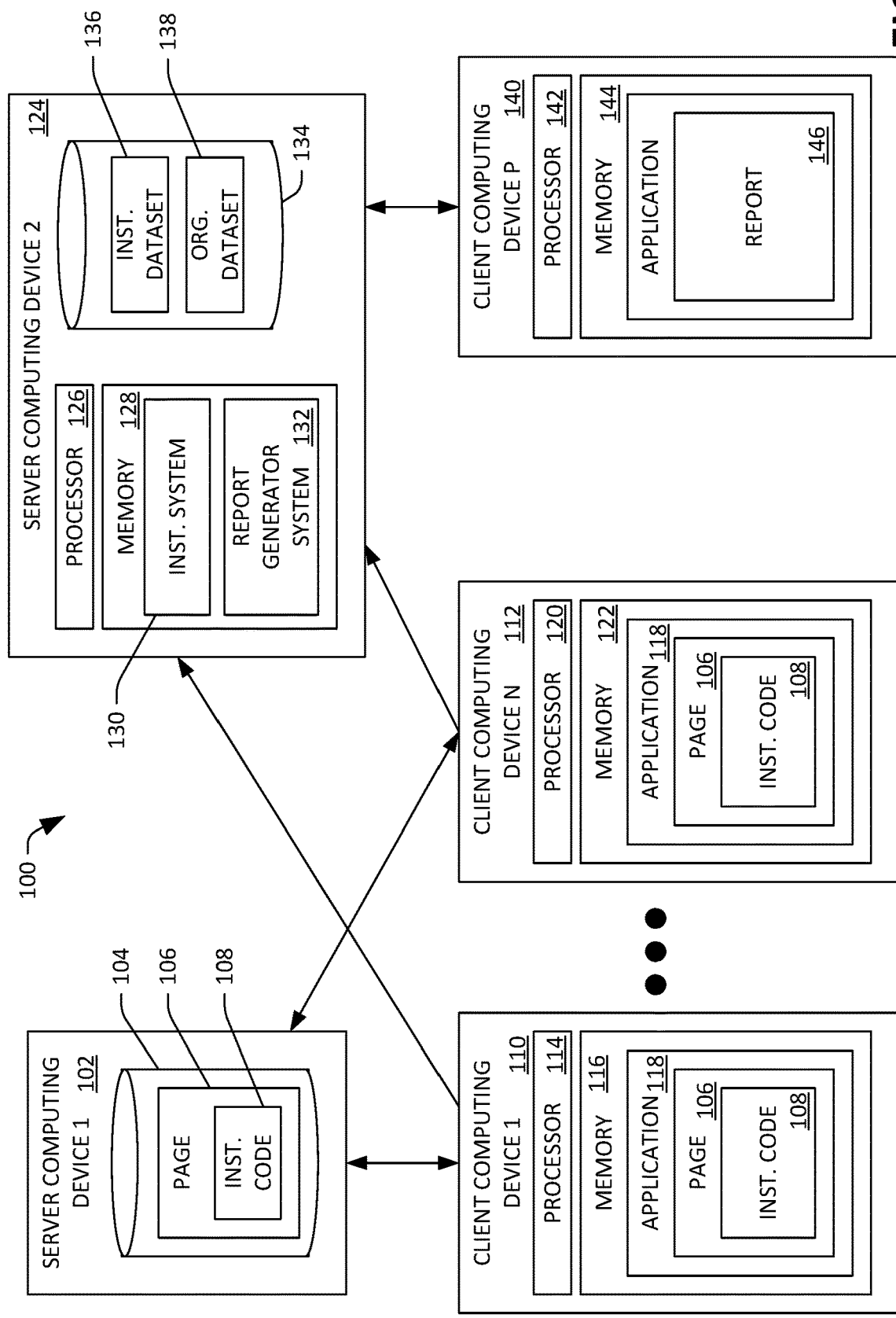
FIG. 1 is a functional block diagram of an exemplary system that facilitates generating a report for an electronic enterprise page.

Various technologies pertaining to instrumenting an electronic enterprise page and generating a report based upon instrumentation data about the enterprise page are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to generating a report for an electronic enterprise page, wherein the report is at least partially based upon organizational data for an enterprise. In contrast to conventional instrumenting technologies, an enterprise page can be instrumented such that a client computing device reports an identity of a user in an enterprise who employs the client computing device to access the enterprise page. When a report is generated for the enterprise page, the report can be based upon organizational data such that the report can indicate how users in the enterprise across sectors (organizations) in the enterprise access the page. This is in contrast to conventional approaches, which are limited to depicting numbers of accesses to an enterprise page without being able to provide information as to how users across different organizations in the enterprise access the enterprise page.

With reference now to FIG. 1, an exemplary system 100 that facilitates instrumenting an enterprise page, as well as generating a report for the enterprise page, is illustrated. The system 100 includes a first server computing device 102 that comprises a data store 104. The data store 104 includes an electronic enterprise page 106, wherein the enterprise page 106 comprises instrumentation code 108. In an example, the enterprise page 106 can be a web page. In another example, the enterprise page 106 can be a page of an analytics application. Generally, it is to be understood that the enterprise page 106 can be an electronic page that can be accessed by way of any suitable computer-executable application, wherein access to the enterprise page 106 is restricted to client computing devices operated by certain users in the enterprise (e.g. a corporation, a charitable organization, a governmental body, etc.). Further, while the enterprise page 106 is depicted as comprising the instrumentation code 108, in another exemplary embodiment the enterprise page 106 may include a pointer (e.g., a uniform resource locator (URL)) to the instrumentation code 108, wherein the instrumentation code 108 itself is retained on a separate server computing device.

The system 100 additionally includes a plurality of client computing devices 110-112 that are in network communication with the first server computing device 102. For instance, the client computing devices 110-112 can access the first server computing device 102 by way of the Internet, an intranet, or other suitable network. As will be described in greater detail herein, the client computing devices 110-112 can be operated by users in the enterprise, wherein the client computing devices 110-112, responsive to receipt of input from the users, can retrieve the enterprise page 106 from the first server computing device 102. With more specificity, in an example, the first client computing device 110 can include a processor 114 and memory 116, wherein the memory 116 has an application 118 loaded therein that is usable to retrieve the enterprise page 106 from the first server computing device 102 and cause the enterprise page 106 to be presented on a display (not shown) of the first client computing device 110. Accordingly, when the enterprise page 106 is a web page, the application 118 may be a web browser. In another example, when the enterprise page 106 is a visualization created by an analytics application, the application 118 can be a client-side analytics application that is configured to retrieve and cause the enterprise page 106 to be opened at the first client computing device 110. Similarly, the Nth client computing device 112 includes a processor 120 and memory 122, wherein the memory 122 includes the application 118 that is configured to retrieve the enterprise page 106 from the first server computing device 102 responsive to receipt of input from a user of the Nth client computing device 112.

As described previously, the enterprise page 106 includes the instrumentation code 108 (or a pointer to the instrumentation code). Generally, when the first client computing device 110 executes the application 118, and when the enterprise page 106 is retrieved from the first server computing device 102 and opened by the application 118, the processor 114 executes the instrumentation code 108. The processor, based upon execution of the instrumentation code 108, generates instrumentation data, wherein the instrumentation data includes an identity of the enterprise page 106 (e.g., a URL of the enterprise page 106), an identity of a user of the first client computing device 110, and a timestamp that indicates when the application opened the enterprise page 106. The processor 114 can utilize any suitable technique to acquire the identity of the user of the first client computing device 110. For instance, when the user logs into an internal network for the enterprise, the first client computing device 110 can maintain an authentication token for the user, wherein the user identity can be derived from the authentication token. Accordingly, the processor 114, responsive to executing the instrumentation code 108, can acquire the authentication token for inclusion in instrumentation data. In another example, the application 118 may receive user credentials (user ID and password) from the user of the first client computing device 110, and the processor 114, responsive to executing the instrumentation code 108, can acquire the user ID from the application 118. In yet another example, when the application 118 retrieves the enterprise page 106 from the first server computing device 102, the application 118 may request user credentials from the user of the first client computing device 110. The processor, responsive to executing the instrumentation code 108, can retrieve the user ID from the application 118. Other mechanisms for capturing the user ID are also contemplated. The Nth client computing device 112 can perform similar operations when retrieving the enterprise page 106 from the first server computing device 102.

The system 100 additionally includes a second server computing device 124 that is in network communication with the client computing devices 110-112. The second server computing device 124 includes a processor 126 and memory 128, wherein the memory 128 has loaded therein an instrumentation system 130 and a report generator system 132. The second server computing device 124 also includes a data repository 134 that comprises an instrumentation dataset 136 and an organizational dataset 138. The instrumentation dataset 136 includes instrumentation data received from client computing devices in the enterprise, such as the client computing devices 110-112. Thus, for example, the instrumentation dataset 136 can include a plurality of records, where each record includes: 1) an identity of an enterprise page that was opened by a client computing device operated by a user in the enterprise; 2) an identity of the user; and 3) a timestamp that indicates when the enterprise page was opened by the client computing device. The organizational dataset 138 comprises directory information for the enterprise. For example, the organizational dataset 138 can include a plurality of records, where each record includes: 1) an identifier for a user in the enterprise; 2) a position of the user in a hierarchy of the enterprise; 3) an identity of a sector (organization) in the enterprise to which the user belongs; 4) an identity of a subsector in the enterprise to which the user belongs; 5) identities of direct reports of the user; 6) identities of one or more supervisors of the user; 7) contact information for the user; 8) geographic information for the user (e.g., where the user is geographically located), and so forth. It is to be understood that the above-described information in records of the organizational dataset 138 is exemplary, and that records may include more or less information.

The instrumentation system 130, when executed by the processor 126, is configured to update the instrumentation dataset 136 responsive to receipt of instrumentation data from a client computing device (e.g., one of the client computing devices 110-112). Hence, when, for example, the first client computing device 110 transmits instrumentation data to the second server computing device 124, the instrumentation system 130 can update the instrumentation dataset 136 to include a record that corresponds to such instrumentation data. Further, when the instrumentation data includes an authentication token, the instrumentation system 130 can ascertain a user identifier that corresponds to the authentication token, and can update the instrumentation dataset 136 to include a record that comprises the user identifier.

The report generator system 132, as will be described in greater detail below, is configured to generate reports for enterprise pages responsive to receipt of requests for such reports. The report generator system 132, for instance, can generate a report for the enterprise page 106 based upon: 1) records in the instrumentation dataset 136 pertaining to the enterprise page 106; and 2) records in the organizational dataset 138 pertaining to users who accessed the enterprise page 106.

The system 100 additionally includes a Pth client computing device 140 that is in network communication with the second server computing device 124. The Pth client computing device 140, for example, can be operated by a user who is charged with maintaining the enterprise page 106. The Pth client computing device 140 includes a processor 142 and memory 144, wherein the memory 144 has the application 118 loaded therein. The Pth client computing device 140 receives an indication from the user thereof that the user wishes to receive a report for the enterprise page 106, and responsive to receiving such indication, the Pth client computing device 140 transmits a request for a report for the enterprise page 106 to the second server computing device 124. The second server computing device 124, responsive to receiving the request, directs the request to the report generator system 132, which generates a report 146 based upon records in the instrumentation dataset 136 and the organizational dataset 138. The report generator system 132 then causes the second server computing device 124 to transmit the report 146 to the Pth client computing device.

As the report 146 is based upon both the instrumentation dataset 136 and the organizational dataset 138, the report 146 not only identifies a number of users in the enterprise who have accessed the enterprise page 106, but also can identify numbers of accesses to the enterprise page 106 across sectors (organizations) of the enterprise.

The Pth client computing device 140, responsive to receiving the report 146, displays the report 146 on a display (now shown). The report 146 can be interactive, in that a user of the Pth client computing device 140 can interact with graphics shown in the report 146, which results in the Pth client computing device 140 transmitting a request for an updated report to the report generator system 132. Responsive to receiving such request, the report generator system 132 can generate an updated report and cause the second server computing device 124 to transmit the updated report to the Pth client computing device 140. For instance, the report 146 can indicate that over a last week 100 unique users in a particular sector of the enterprise accessed the enterprise page 106. The user of the computing device 140 can interact with the report 146 by requesting, for example, a breakdown of how users across subsectors in the sector accessed the enterprise page 106. That is, the sector may include four subsectors, and the user of the client computing device 140 may wish to ascertain how many users in each subsector accessed the enterprise page 106 over the last week. As the instrumentation dataset 136 includes user identifiers for each access to the enterprise page 106, a viewer of the report 146 may granularly review accesses to the enterprise page 106 down to an individual user in the enterprise.

Exemplary operation of the system 100 is now set forth. An enterprise user of the first client computing device 110 may cause the application 118 to be loaded into the memory 116 of the first client computing device 110, and may direct the application 118 to retrieve the enterprise page 106 from the first server computing device 102. The first server computing device 102, responsive to receiving a request for the enterprise page 106 from the first client computing device 110, can transmit the enterprise page 106 to the first client computing device 110. The enterprise page 106 includes the instrumentation code 108 (or a pointer thereto), such that when the application 118 loads the enterprise page 106, the processor 114 executes the instrumentation code 108.

The processor 114, responsive to executing the instrumentation code 108, generates instrumentation data for the enterprise page 106, where the instrumentation data includes an identifier for the enterprise page 106, an identifier for the enterprise user of the first client computing device 110, and a timestamp that indicates when the application 118 opened the enterprise page 106. The processor 114, responsive to executing the instrumentation code 108, causes the first client computing device 110 to transmit the instrumentation data to the second server computing device 124, whereupon the instrumentation data is provided to the instrumentation system 130.

The instrumentation system 130, responsive to receiving the instrumentation data, updates the instrumentation dataset 136 to include a record pertaining to the instrumentation data received from the first client computing device 110. This process can be repeated for each access to the enterprise page 106 by client computing devices operated by users in the enterprise.

A user of the Pth client computing device 140 may, at some point in time, wish to receive a report about the enterprise page 106. Accordingly, the user of the Pth client computing device 140 can cause the application 118 to be loaded into the memory 144 and executed by the processor 142, and can subsequently cause the application 118 to request a report from the report generator system 132. The report generator system 132 can review the request and ascertain that the request is for a report for the enterprise page 106 (e.g., based upon an identifier for the enterprise page 106 in the request). The report generator system 132 may then query the instrumentation dataset 136 using the identifier for the enterprise page 106 to obtain search results, wherein the search results include records that represent accesses to the enterprise page 106 by client computing devices operated by users in the enterprise. As described previously, the search results include identifiers for users in the enterprise who accessed the enterprise page 106. The report generator system 132 may then perform a join between the search results and the organizational dataset 138, thereby generating join results. The join results include several records, wherein each record can include an identifier of a user who accessed the enterprise page 106, a timestamp that indicates when the enterprise page was accessed, a position of the user in a hierarchy of the enterprise (based upon information in the organizational dataset 138), such as a sector to which the user belongs, a subsector to which the user belongs, contact information for the user, direct reports of the user, supervisors of the user, and so forth. The report generator system 132 can generate the report 146 based upon these join results, wherein the report 146 comprises data that is indicative of accesses to the enterprise page 106 by users of the enterprise across sectors of the enterprise. The report generator system 132 may then cause the report 146 to be transmitted to the client computing device 140, whereupon it can be presented to the user of the client computing device 140 on a display.

In an exemplary embodiment, the report 146 can pertain to a certain time range. Therefore, for instance, the report 146 can represent a number of accesses to the enterprise page 106 across the time range (e.g., the number of accesses to the enterprise page 106 over the last week). In another example, the report 146 can indicate a number of accesses to the enterprise page over the time range across sectors of the enterprise. The user of the Pth client computing device 140 can alter the time range such that the report 146 can be updated to represent different time ranges. For instance, the user of the Pth client computing device 140 can indicate that rather than viewing accesses to the enterprise page 106 over the last week, the report 146 is to be updated to represent a number of accesses to the enterprise page 106 over a most recent 24 hours. The application 118 can cause the Pth client computing device to transmit this request for the updated report to the second server computing device 124, whereupon the report generator system 132 can update the report 146 and transmit the updated report 146 to the Pth client computing device 140 for presentment on the display.

In another example, the user of the Pth client computing device 140 can "drill down" into sectors and/or subsectors of the enterprise when interacting with the report 146. For example, the report 146 may include a bar graph that comprises a bar that represents a number of accesses to the enterprise page 106 by users who belong to a certain sector in the enterprise. The user of the Pth client computing device 140 can select such bar, wherein selection of the bar indicates that the user wishes to view accesses across subsectors of the sector. The application 118 can cause the Pth client computing device to transmit a request for such an update to the second server computing device 124, whereupon the report generator system 132 updates the report to depict accesses to the enterprise page 106 by subsectors that belong to the sector. The report generator system 132 then causes the second server computing device 124 to transmit the updated report to the Pth client computing device 140, whereupon the Pth client computing device 140 can present the updated report 146 on the display.

While the report generator system 132 has been described above as generating the report 146 by performing a join between search results from the instrumentation dataset 136 and records of the organizational dataset 138, it is to be understood that the report generator system 132 can utilize different techniques to generate reports. For instance, the report generator system 132 can update the instrumentation dataset 136 based upon records in the organizational dataset 138 at the time of receipt of instrumentation data from a client computing device. More specifically, when the instrumentation system 130 receives instrumentation data from a client computing device, where the instrumentation data includes an identifier for a user of the client computing device, the instrumentation system 130 can search the organizational dataset 138 based upon the user identifier, resulting in retrieval of organizational data pertaining to the user from the organizational dataset 138. The instrumentation system 130 can then append this organizational data to the instrumentation data (thereby updating the instrumentation data), and the instrumentation system 130 can include the instrumentation data in the instrumentation dataset 136. In such an embodiment, the report generator system 132, when requested to generate a report, can generate the report by searching the instrumentation dataset 136 (without having to perform a join with the organizational dataset 138).

It can be ascertained that the system 100 offers several improvements over conventional approaches for instrumenting enterprise pages and generating reports for enterprise pages. As indicated previously, conventionally, instrumenting systems were limited to providing numbers of accesses to an enterprise page while lacking the ability to represent more detail about how users across the enterprise access the enterprise page 106. Using the system 100, the report 146 can represent how users across different sectors of the enterprise interact with the enterprise page 106 over time.

Figure 2:
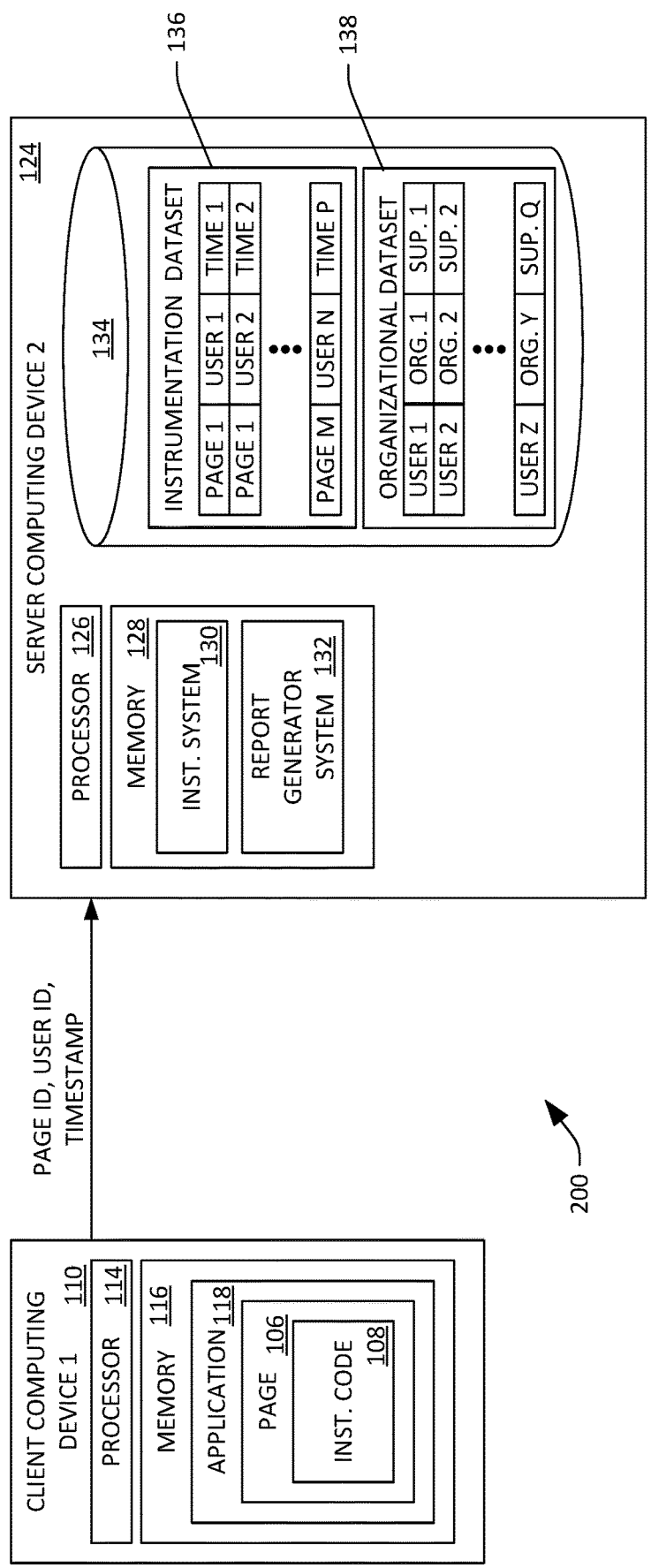
FIG. 2 is a functional block diagram of an exemplary system that facilitates updating an instrumentation dataset based upon instrumentation data received from a client computing device.

Now referring to FIG. 2, an exemplary system 200 that facilitates updating the instrumentation dataset 136 and generating a report for the enterprise page 106 is illustrated. The system 200 includes the first client computing device 110 and the second server computing device 124, which are in communication with one another by way of a suitable network. As described previously, responsive to the processor 114 executing the instrumentation code 108 in the enterprise page 106, the processor 114 generates instrumentation data, where the instrumentation data includes an identifier for the enterprise page 106, an identifier for a user of the first client computing device 110, and a timestamp that indicates when the enterprise page 106 was accessed at the first client computing device 110. The instrumentation code 108 may be in the form of a widget that is installed in the enterprise page 106. In another example, the instrumentation code 108 can be a script that is downloaded from another server computing device that is in communication with the first client computing device 110.

The second server computing device 124 receives the instrumentation data from the first client computing device 110, whereupon the instrumentation data is provided to the instrumenting system 130. The data store 134 includes the instrumentation dataset 136, which includes several records. Each record in the records includes an identifier for an enterprise page, an identifier for a user who accessed the enterprise page, and a timestamp that indicates when the enterprise page was accessed. The instrumenting system 130, responsive to receiving the instrumentation data reported by the first client computing device 110, updates the instrumentation dataset 136 to include a record that corresponds to the instrumentation data. Hence, the instrumentation dataset 136 can comprise a record for each access to each enterprise page being instrumented.

The organizational dataset 138 also includes a plurality of records. In an example, each record can correspond to a user in the enterprise, and can include information as to the hierarchical position of the user in the enterprise. As shown in FIG. 2, for example, a record in the organizational dataset 138 can include a user identity; an identity of an organization (sector) in the enterprise to which the user belongs, a supervisor for the user, amongst other organizational data.

When the report generator system 132 receives a request to generate a report for an enterprise page, the report generator system 132 can initially search the instrumentation dataset 136 using an identifier for the enterprise page and; optionally, a time range. For instance, the report generator system 132 can search the instrumentation dataset 136 using an identifier for the enterprise page 106. Thus; the report generator system 132 generates a set of search results, where the search results include records in the instrumentation dataset 136 that include the identifier for the enterprise page 106. Thereafter, the report generator system 132 can perform a join operation between the search results and the organizational dataset 138, wherein the join is based upon user identifiers in the search results. The resulting join results, then, include identifiers for users who accessed the enterprise page 106 as well as organizational data pertaining to the users who accessed the enterprise page 106.

Figure 3:
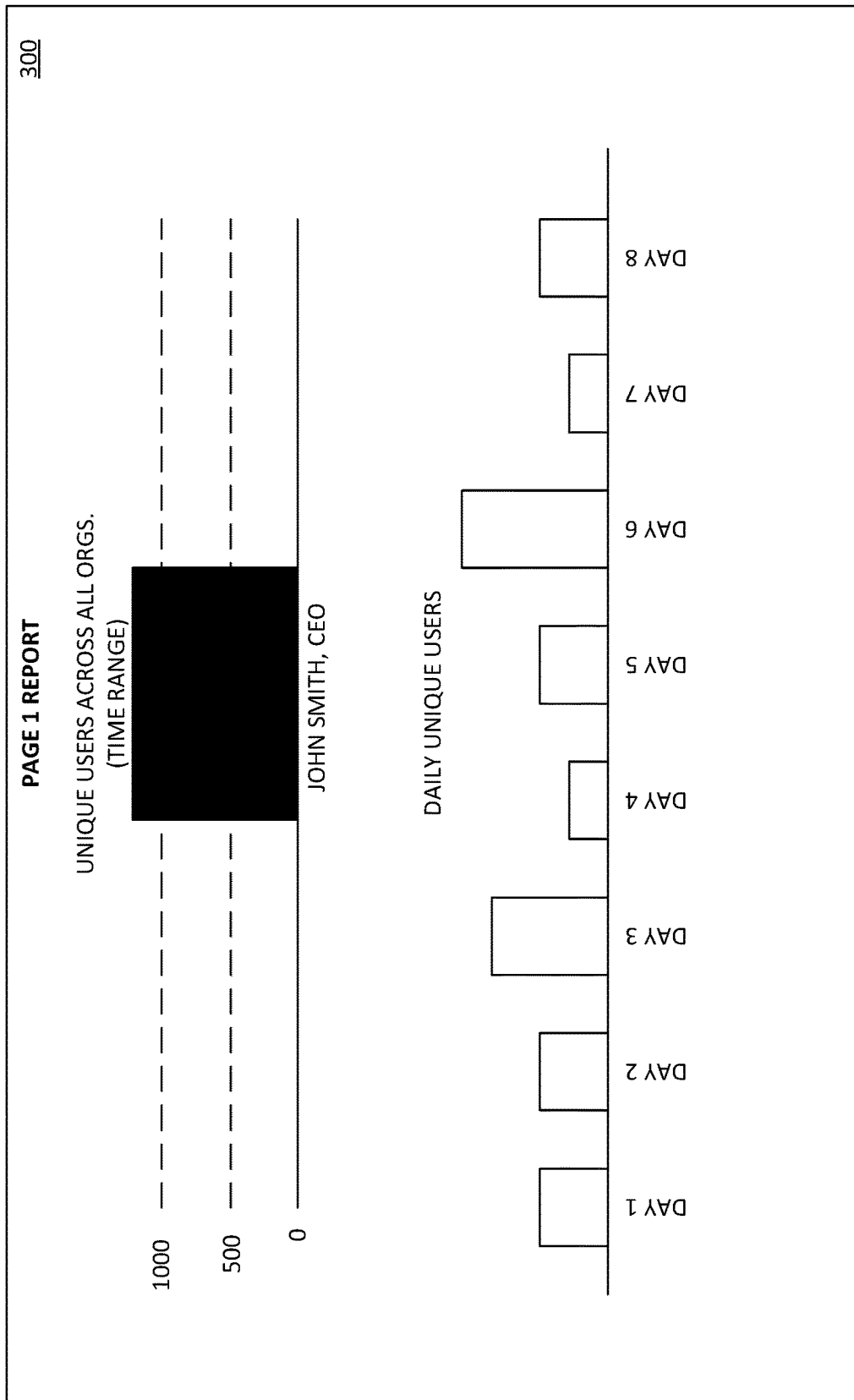
FIGS. 3 and 4 illustrate n exemplary reports for an enterprise page.

Now referring to FIG. 3, an exemplary report 300 that can be generated by the report generator system 132 is illustrated. The report 300 can be transmitted to the Pth client computing device 140 for presentment on a display of the client computing device 140. The report 300 is a visualization that represents how users in the enterprise accessed an enterprise page (e.g., the enterprise page 106) to which the report 300 pertains. The report 300, in this example, includes two sections: a first section and a second section. The first section depicts a bar graph that represents a number of unique users across all sectors of the enterprise who viewed the enterprise page (with John Smith being the CEO of the enterprise). Specifically, the bar graph indicates that over 1,000 unique users in the enterprise viewed the enterprise page 106 over some defined time range (e.g., eight days). The second sector of the report 300 also includes a bar graph, which depicts a number of accesses to the enterprise page 106 per day over an eight-day time window.

Figure 4:
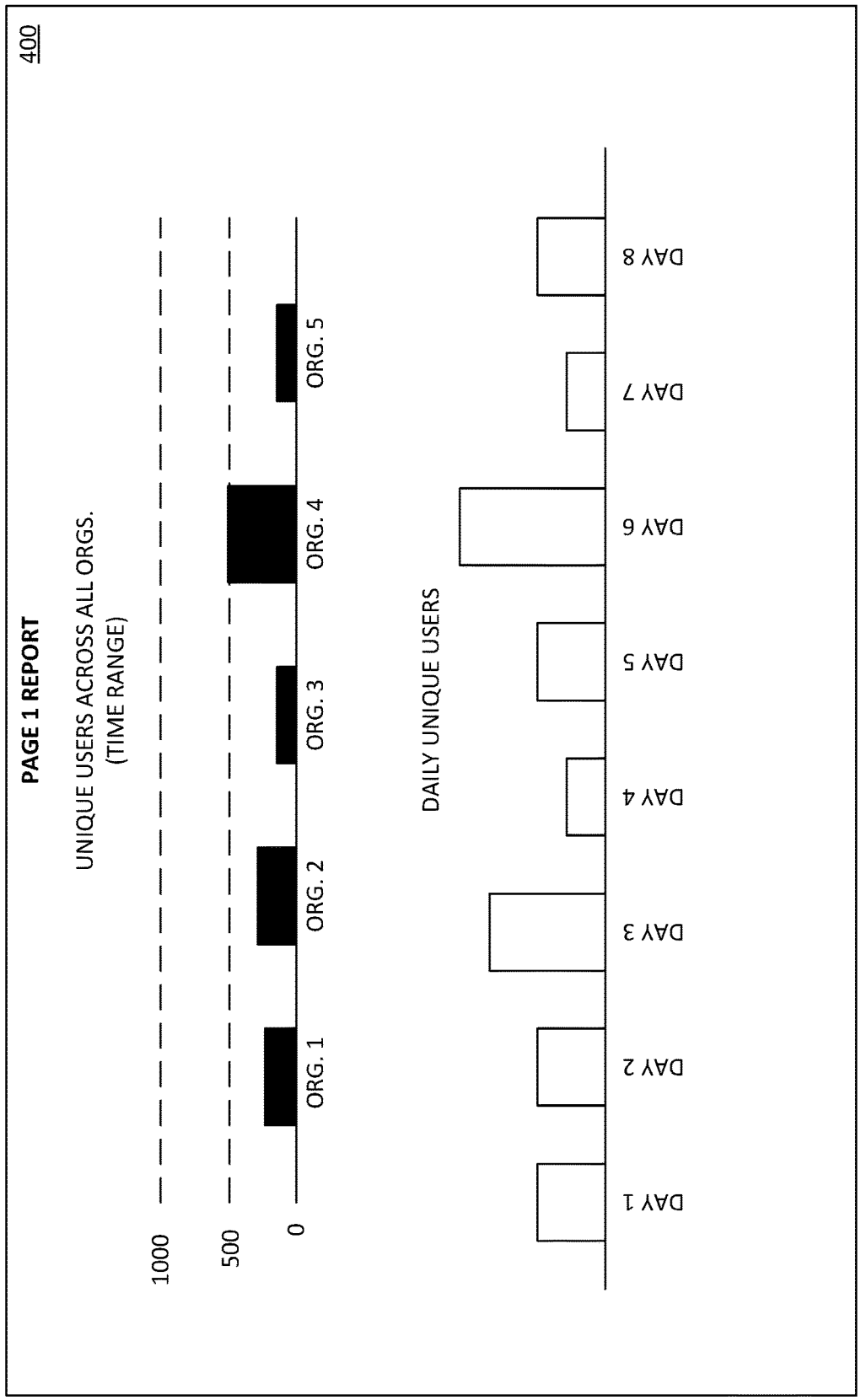

A user of the Pth client computing device 140 can interact with the report 302 to retrieve additional information about how users in the enterprise have accessed the enterprise page. For instance, turning briefly to FIG. 4, when the user of the Pth client computing device 140 interacts with the report 300 (e.g., selects the bar depicted in the first sector of the report 300 shown in FIG. 3), the report generator system 132 can update the report and transmit an updated report 400 to the Pth client computing device 140. The updated report 400 can present more granular information as to how users across organizations of the enterprise have accessed the page. For example, the first sector of the updated report 400 indicates that more users in a fourth organization in the enterprise accessed the enterprise page when compared to other organizations in the enterprise. Further, the updated report 400 indicates that a relatively small number of users in a third organization accessed the enterprise page 106 over the specified time range. This may indicate to a viewer of the report that visibility of the enterprise page 106 needs to be improved with respect to users in the third organization. The viewer of the updated report 400 can further drill down by time, can drill down to individual users who access the report, and so forth.

Figure 5:
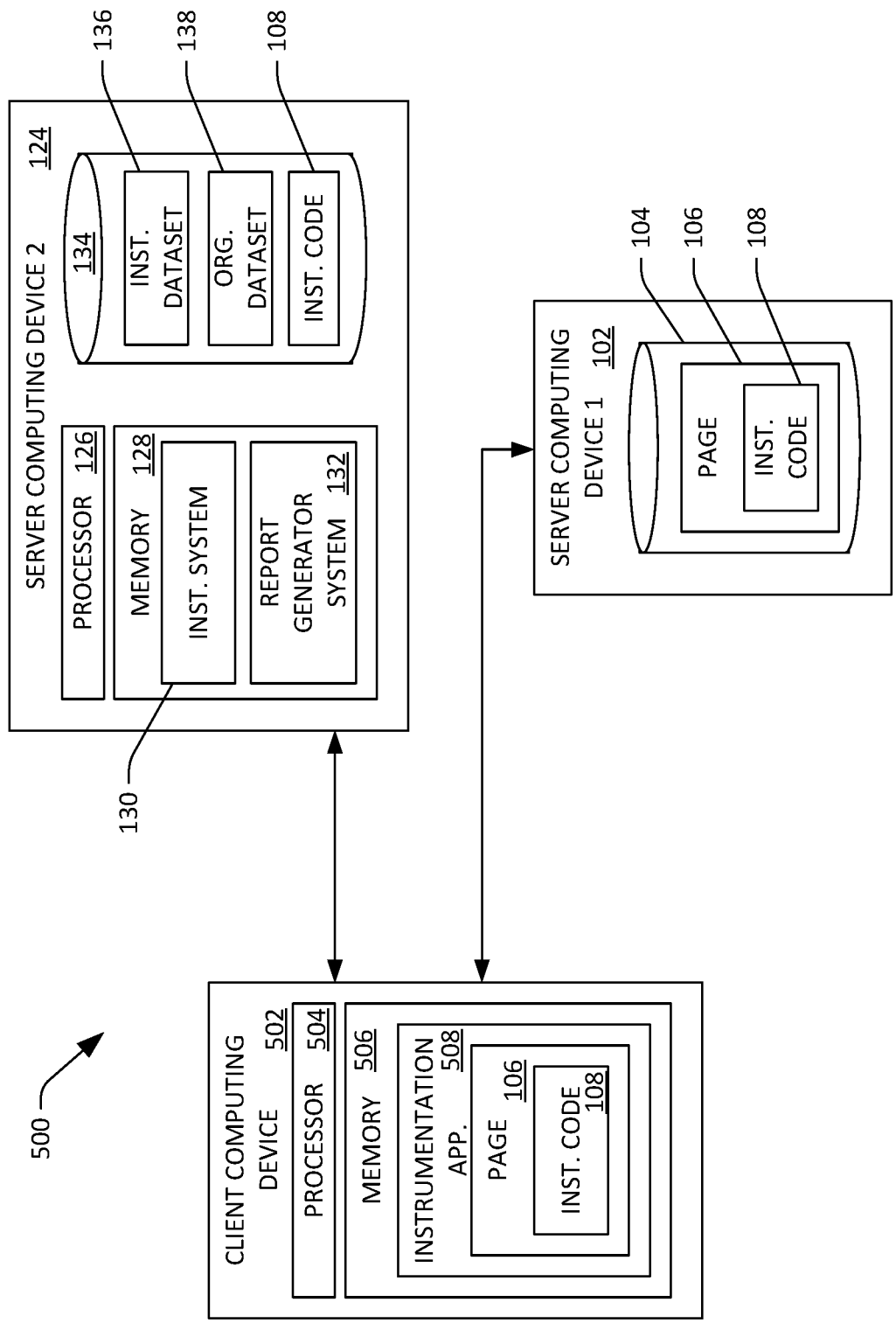
FIG. 5 is an exemplary system that facilitates updating an enterprise page to include instrumentation code.

Now referring to FIG. 5, an exemplary system 500 that facilitates adding the instrumentation code 108 to the enterprise page 106 is illustrated. The system 500 includes a client computing device 502 that comprises a processor 504 and memory 506, wherein the memory 506 has an instrumentation application 508 loaded therein. For example, the instrumentation application 508 may be a web browser, may be a client-side instance of an analytics application, etc. The user of the client computing device 502 causes the enterprise page 106 to be loaded into the instrumentation application 508, whereupon the user of the client computing device 502 can indicate that instrumentation code is to be included in the enterprise page 106. Responsive to receiving such indication, the client computing device 502 can transmit a request to the second server computing device 124 for the instrumentation code 108.

The data store 134 of the second server computing device 124 includes the instrumentation code 108. The second server computing device 124, responsive to receiving the request, transmits the instrumentation code 108 to the client computing device 502, whereupon the user of the client computing device 502 can set forth input to the client computing device 502 that causes the instrumentation code 108 to be included in the enterprise page 106. As indicated previously, the instrumentation code 108, in a first example, may be a widget that is included in the enterprise page 106, wherein the widget, when executed by a processor, causes the instrumentation data (described above) to be generated and transmitted to the second server computing device 124. In another example, the instrumentation code 108 may be a script that can be executed by, for instance, a web browser. In still yet another example, the second server computing device 124 may transmit a URL to the client computing device 502, where the URL points to the instrumentation code 108. The URL can be included in code for the enterprise page 106. When a web browser parses the code of the enterprise page 106, the web browser is directed to the URL address, and the web browser retrieves the instrumentation code 108.

Once the enterprise page 106 has been updated to include the instrumentation code 108, the client computing device 502 can transmit the enterprise page 106 to the first server computing device 102. The first server computing device 102 retains the enterprise page 106 with the instrumentation code 108 included therein, such that the enterprise page 106 is accessible to client computing devices in the enterprise. While the second server computing device 124 has been described as retaining the instrumentation code 108, it is to be understood that the instrumentation code 108 may be retained at some other location that is able to be accessed by the client computing device 502 (e.g., a server computing device of a CDN of the enterprise).

FIGS. 6-10 illustrate exemplary methodologies relating to instrumenting enterprise pages and generating reports about enterprise pages. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 6:
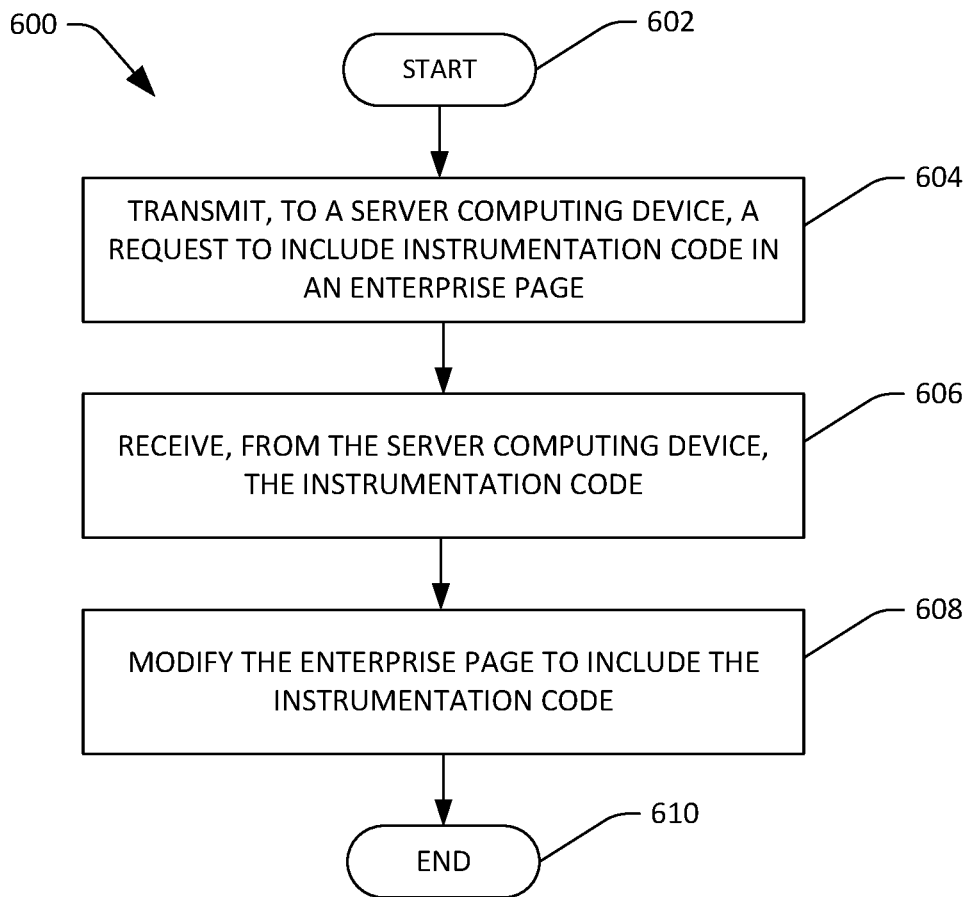
FIG. 6 is a flow diagram illustrates an exemplary methodology for modifying an enterprise page to include instrumentation code.

Now referring solely to FIG. 6, an exemplary methodology 600 for updating an enterprise page to include instrumentation code is illustrated. The methodology 600 can be executed by a client computing device, such as a desktop computing device, a slate computing device, a laptop computing device, a mobile telephone, a wearable computing device, etc. The methodology 600 starts at 602, and at 604 a request is transmitted to a server computing device, wherein the request indicates that instrumentation code is to be included in an enterprise page. For example, a person who is tasked with maintaining the enterprise page may operate a client computing device to cause the client computing device to request the instrumentation code from the server computing device.

At 606, the instrumentation code is received from the server computing device, and at 608 the enterprise page is modified to include the instrumentation code (in response to the user of the client computing device indicating that the enterprise page is to be modified to include the instrumentation code). As noted above, modifying enterprise page can include causing a widget is to be included in the enterprise page, updating code of the enterprise page to include the instrumentation code, updating code of the enterprise page to include an address of the instrumentation code, etc. The instrumentation code is configured to generate instrumentation data when executed at a client computing device, where the instrumentation data comprises an identifier for a user who operates the client computing device when the enterprise page is accessed. The methodology 600 completes at 610.

Figure 7:
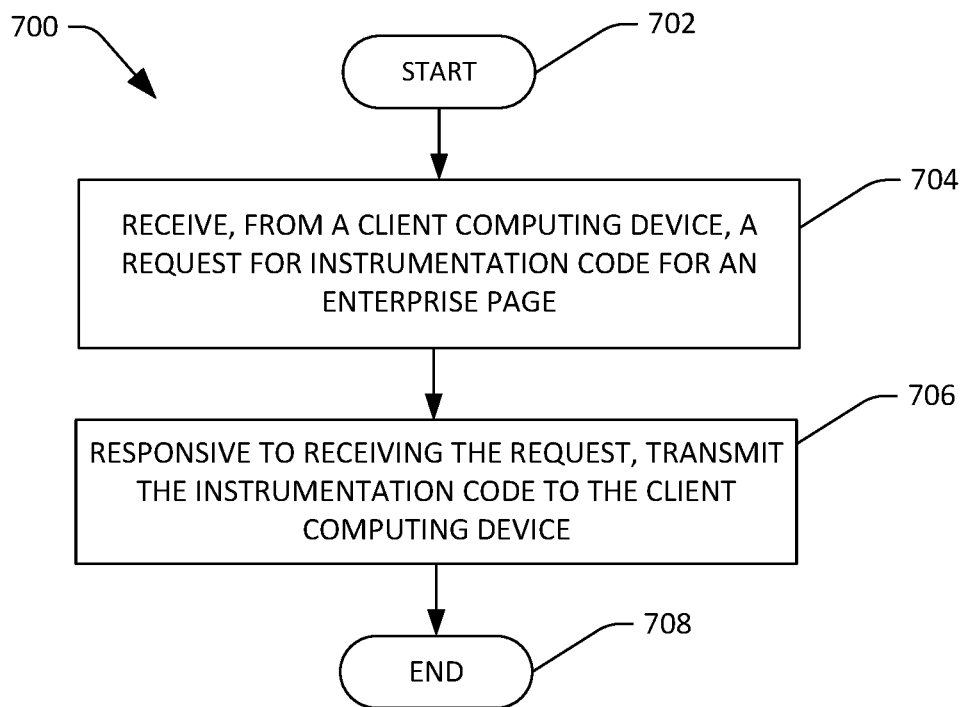
FIG. 7 is an exemplary methodology for transmitting instrumentation code to a client computing device for inclusion in an enterprise page.

With reference to FIG. 7, an exemplary methodology 700 that facilitates transmitting instrumentation code to a client computing device is illustrated. The methodology 700 is performed by a server computing device that is in network communication with the client computing device. The methodology 700 starts at 702, and at 704 a request is received from the client computing device, wherein the request is for instrumentation code for an enterprise page. At 706, responsive to receiving the request, the instrumentation code is transmitted to client computing device that requested the instrumentation code, whereupon the enterprise page can be updated to include the instrumentation code. The methodology 700 completes at 708.

Figure 8:
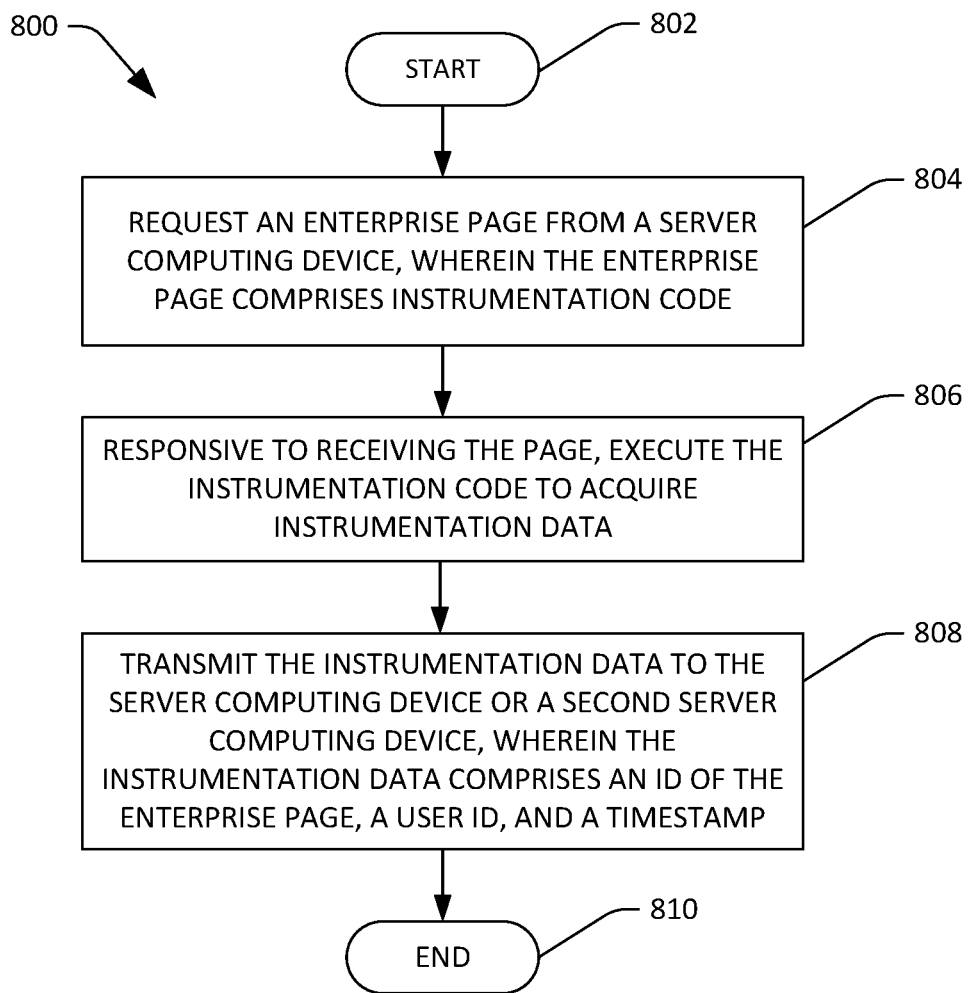
FIG. 8 is a flow diagram illustrating an exemplary methodology for transmitting instrumentation data to a server computing device.

Now referring to FIG. 8, an exemplary methodology 800 facilitates transmitting instrumentation data to a server computing device is illustrated, wherein a client computing device performs the methodology 800. The methodology 800 starts at 802, and at 804 a request for an enterprise page is transmitted to a server computing device, wherein the enterprise page comprises instrumentation code. At 806, responsive to receiving the enterprise page, the instrumentation code is executed and instrumentation data is generated responsive to executing the instrumentation code. As noted previously, the instrumentation data can include an identity of the user of the client computing device, an identity of the enterprise page, and a timestamp. At 808, the instrumentation data is transmitted to the server computing device or some other server computing device. The server computing device or second server computing device can update an instrumentation dataset to include the instrumentation data for the enterprise page. The methodology 800 completes at 810.

Figure 9:
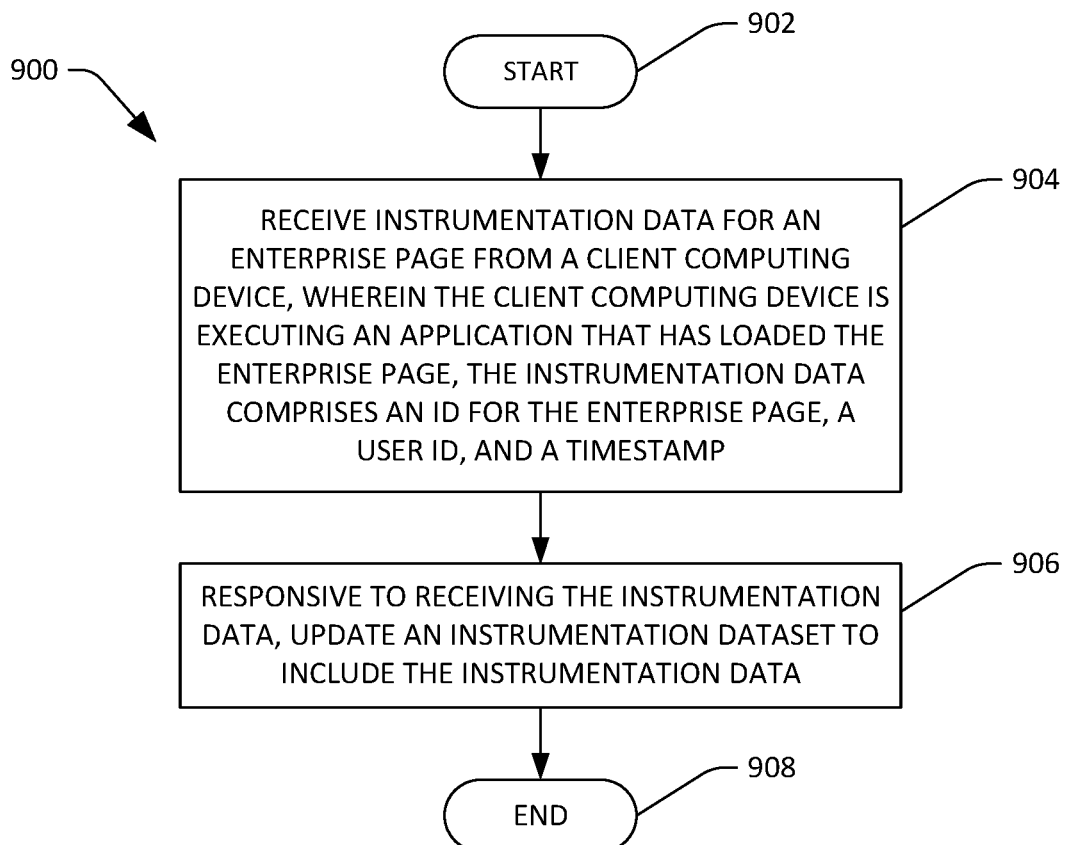
FIG. 9 is a flow diagram illustrating an exemplary methodology for updating an instrumentation dataset.

Turning now to FIG. 9, an exemplary methodology 900 that facilitates updating an instrumentation dataset responsive to receipt of instrumentation data from a client computing device is illustrated, wherein the methodology 900 is performed by a server computing device. The methodology 900 starts at 902, and at 904 instrumentation data for an enterprise page is received from a client computing device, wherein the client computing device is executing an application that has loaded the enterprise page, and further wherein the instrumentation data comprises an identifier for the enterprise page, a user identifier, and a timestamp. At 906, responsive to receiving the instrumentation data, the instrumentation dataset is updated to include the instrumentation data. For instance, a record can be added to the instrumentation dataset, wherein the record corresponds the instrumentation data. The methodology 900 completes at 908.

Figure 10:
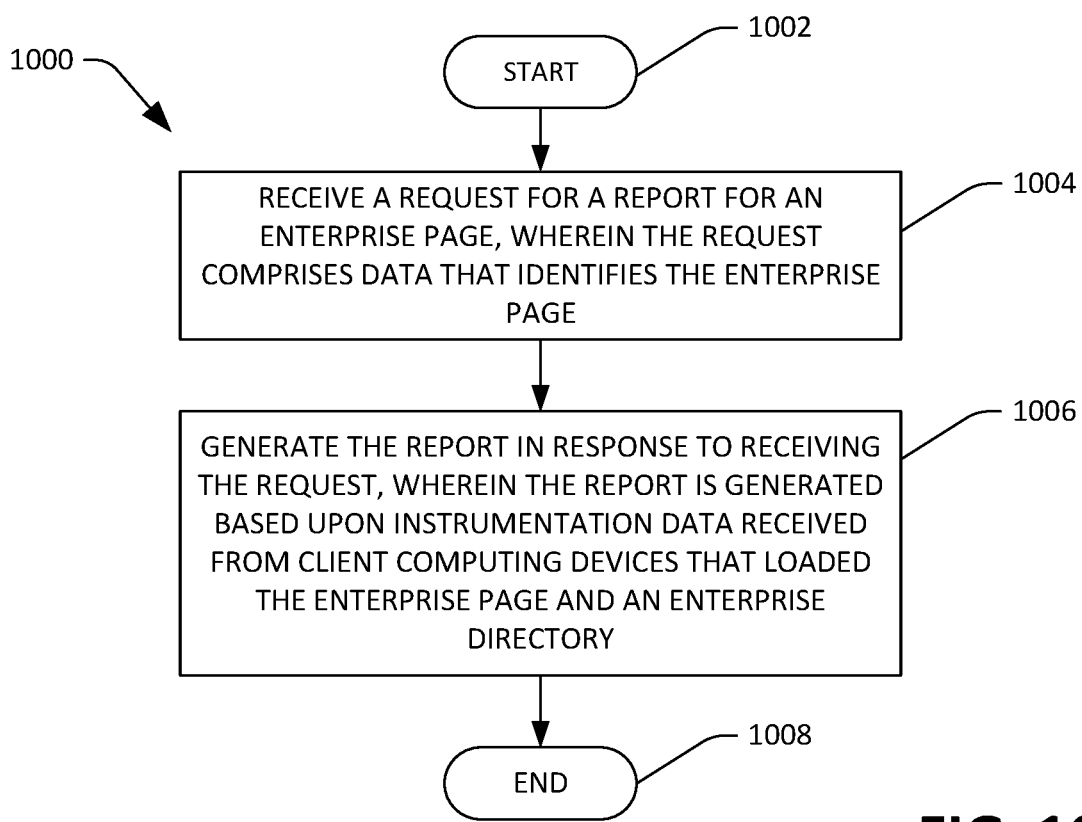
FIG. 10 is a flow diagram illustrating an exemplary methodology for generating a report for an enterprise page.

Referring now to FIG. 10, an exemplary methodology 1000 that facilitates generating a report for an instrumented enterprise page is illustrated, where the methodology 1000 is executed at a server computing device. The methodology 1000 starts at 1002, and at 1004, a request for a report for an enterprise page is received from a client computing device, wherein the request comprises data that identifies the enterprise page. For example, a user operating a client computing device who is tasked with maintaining the enterprise page can request the report for the enterprise page. At 1006, the report is generated in response to receiving the request, wherein the report is generated based upon instrumentation data received from client computing devices that loaded the enterprise page and is also based upon an enterprise directory, wherein the enterprise directory includes information as to the hierarchy of the enterprise. The methodology 1000 completes at 1008.

Figure 11:
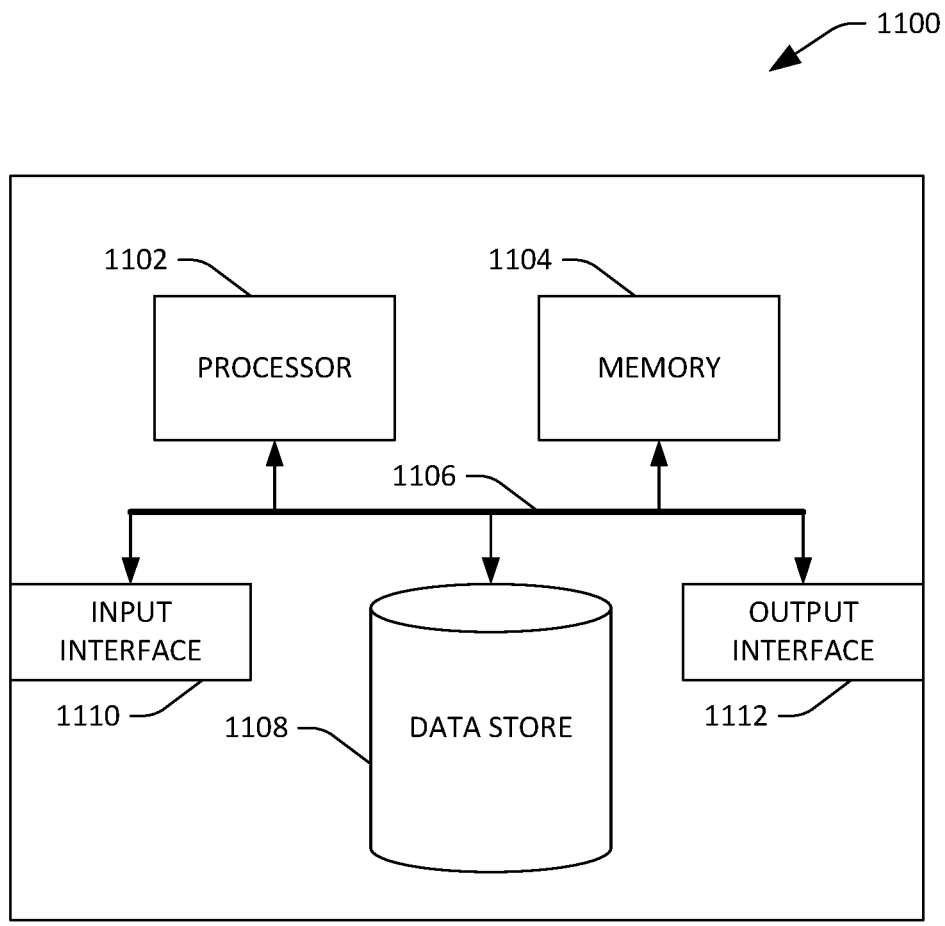
FIG. 11 is an exemplary computing system.

Referring now to FIG. 11, a high-level illustration of an exemplary, computing device 1100 that can be used in accordance with the systems and methodologies disclosed herein is illustrated. For instance, the computing device 1100 may be used in a system that supports adding instrumentation code to an enterprise page. By way of another example, the computing device 1100 can be used in a system that supports generating reports for enterprise pages. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store enterprise pages, organizational data, etc.

The computing device 1100 additionally includes a data store 1108 that is accessible by the processor 1102 by way of the system bus 1106. The data store 1108 may include executable instructions, enterprise pages, an instrumentation dataset, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces; natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, RUM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a processor of a server computing device, the method comprising:
   receiving, from a client computing device that is in network communication with the server computing device, a request for an electronic report for an enterprise page, wherein the enterprise page is accessed by users in an enterprise;
   generating the electronic report in response to receipt of the request for the electronic report, wherein the electronic report is generated based upon an organizational dataset stored in computer-readable storage, wherein the organizational dataset comprises identities of users in the enterprise and sectors of the enterprise to which the users belong, and further wherein the electronic report comprises data that is indicative of numbers of historic accesses to the enterprise page by client computing devices operated by the users across different sectors of the enterprise represented in the organizational dataset; and
   transmitting the electronic report to the client computing device responsive to generating the electronic report, wherein the electronic report is provided to the client computing device for presentment on a display of the client computing device.

2. The method of claim 1, further comprising:
   prior to receiving the request for the electronic report, receiving instrumentation data from a second client computing device, wherein the second client computing device has loaded the enterprise page, and further wherein the instrumentation data comprises an identity of a user of the second client computing device, the user of the second client computing device is a user in the enterprise; and
   responsive to receiving the instrumentation data from the second client computing device, updating an instrumentation dataset to include the instrumentation data, wherein the electronic report is generated based upon the instrumentation data in the instrumentation dataset.

3. The method of claim 2, wherein generating the electronic report comprises:
   searching the instrumentation dataset based upon an identifier for the enterprise page included in the request for the electronic report to generate search results; and
   joining the search results with the organizational dataset to generate join results, wherein the join results comprise identities of a subset of users in the enterprise who accessed the enterprise page and the corresponding sectors of the enterprise to which the subset of users belong, wherein the electronic report is generated based upon the join results.

4. The method of claim 3, wherein the instrumentation data further comprises an identifier of the enterprise page and a timestamp that indicates when the second client computing device loaded the enterprise page.

5. The method of claim 1, wherein the request specifies a time range, and wherein the data is indicative of the historic accesses to the enterprise page across the different sectors of the enterprise within the specified time range.

6. The method of claim 1, wherein the enterprise page is a web page.

7. The method of claim 1, further comprising:
   receiving, from the client computing device, a request for additional information about a sector in the enterprise; and
   responsive to receiving the request, updating the electronic report to represent a number of historic accesses to the enterprise page by a subset of users in the enterprise who are in the sector of the enterprise.

8. The method of claim 7, further comprising:
   prior to receiving the request for the electronic report, receiving an indication that the enterprise page is to be instrumented from a second client computing device; and
   transmitting instrumentation code for inclusion in the enterprise page in response to receipt of the indication.

9. The method of claim 1, wherein the electronic report identifies a number of unique users in the enterprise who have accessed the enterprise page over a time range.

10. A server computing device comprising:
    a processor; and
    memory comprising instructions that, when executed by the processor, cause the processor to perform acts comprising:
       generating an electronic report on an enterprise page in response to receipt of a request for the electronic report from a client computing device that is in communication with the server computing device over a network, wherein the electronic report is generated based upon content of an organizational dataset stored in computer-readable storage that is accessible to the processor, wherein the organizational dataset comprises identities of users in an enterprise and identities of sections of the enterprise to which the users belong, wherein a subset of the users in the enterprise have accessed the enterprise page, and further wherein the electronic report comprises data that is indicative of a number of users in the subset of users who, through use of client computing devices, have accessed the enterprise page, wherein the subset of users belong to a section of the enterprise in the sections; and
       responsive to generating the report, transmitting, over the network, the electronic report to the client computing device for presentment on a display of the client computing device.

11. The server computing device of claim 10, wherein the enterprise page is a web page.

12. The server computing device of claim 10, wherein the electronic report is generated based upon instrumentation data received from multiple client computing devices operated by the users in the enterprise who have accessed the enterprise page, wherein the instrumentation data comprises identities of the users in the enterprise who have accessed the enterprise page.

13. The server computing device of claim 12, the acts further comprising:
   prior to generating the electronic report, transmitting instrumentation code to the multiple client computing devices, wherein the instrumentation code, when executed by the multiple client computing devices, causes the client computing devices to transmit the instrumentation data to the server computing device.

14. The server computing device of claim 10, the acts further comprising:
   receiving a request for the electronic report, wherein the request comprises an identifier for the enterprise page, and wherein generating the electronic report comprises:
      querying an instrumentation dataset based upon the identifier for the enterprise page to acquire search results, the search results comprise identities of the users who have accessed the enterprise page;
      performing a join between the search results and the organizational dataset based upon the identities of the users who have accessed the enterprise page in the search results and the identities of the users in the organizational dataset; and
   generating the electronic report based upon the join.

15. The server computing device of claim 10, the acts further comprising:
   receiving a request from the client computing device to update the electronic report such that the electronic report represents accesses to the enterprise page across sub-sections of the section;
   updating the electronic report based upon the request; and
   transmitting the updated electronic report to the client computing device for presentment on the display of the client computing device.

16. The server computing device of claim 10, wherein the electronic report further indicates numbers of users that belong to the section who have accessed the enterprise page over multiple windows of time.

17. A computer-readable storage medium comprising instructions that, when executed by a processor, cause the processor to perform acts comprising:
   updating, in computer-readable storage that is accessible to the processor, an instrumentation dataset based upon instances of instrumentation data received from client computing devices that accessed an enterprise page, wherein each instance of the instrumentation data comprises an identifier for the enterprise page and an identifier of a user of a client computing device who accessed the enterprise page through use of the client computing device;
   receiving, over a network connection, a request for an electronic report for the enterprise page from a second client computing device;
   responsive to receiving the request, generating the electronic report based upon the instrumentation dataset and an organizational dataset that is stored in the computer-readable storage, the organizational dataset comprises identifies of users in the enterprise and sectors of the enterprise to which the users in the enterprise belong, wherein the electronic report comprises data that is indicative of numbers of users in the enterprise who accessed the enterprise page across sectors of the enterprise; and
   responsive to generating the electronic report, transmitting the electronic report to the second client computing device for presentment on a display thereof.

18. The computer-readable storage medium of claim 17, wherein the enterprise page is a web page.

19. The computer-readable storage medium of claim 17, wherein generating the electronic report based upon the instrumentation dataset and the organizational dataset comprises extracting entries from the organizational dataset based upon the identities of the users in the instrumentation dataset.

20. The computer-readable storage medium of claim 17, wherein the electronic report additionally comprises data that is indicative of a number of unique users in the enterprise who accessed the enterprise page over several windows of time.

* * * * *